United States Patent
Kawaguchi et al.

[11] Patent Number: 5,286,039
[45] Date of Patent: Feb. 15, 1994

[54] METAL GASKET

[75] Inventors: Shigeru Kawaguchi; Kenji Kubouchi; Naoki Ii; Kunitoshi Inoue, all of Osaka, Japan

[73] Assignee: Nippon Gasket Co., Ltd., Osaka, Japan

[21] Appl. No.: 932,184

[22] Filed: Aug. 20, 1992

[30] Foreign Application Priority Data

Aug. 21, 1991 [JP] Japan ................................ 3-232449

[51] Int. Cl.$^5$ ............................................. F16J 15/08
[52] U.S. Cl. ................... 277/180; 277/235 B
[58] Field of Search .................. 277/233, 234, 235 B, 277/236, 180

[56] References Cited

U.S. PATENT DOCUMENTS

| | | | |
|---|---|---|---|
| 4,272,085 | 6/1981 | Fujikawa et al. | 277/235 B |
| 4,728,110 | 3/1988 | Nakasone | 277/235 B X |
| 4,799,695 | 1/1989 | Yoshino | 277/234 X |
| 4,836,562 | 6/1989 | Yoshino | 277/236 X |
| 5,022,661 | 6/1991 | Nakasone | 277/235 B X |
| 5,082,298 | 1/1992 | Uchida et al. | 277/235 B |

FOREIGN PATENT DOCUMENTS

| | | | |
|---|---|---|---|
| 0306766 | 3/1989 | European Pat. Off. | |
| 2818472 | 10/1979 | Fed. Rep. of Germany | 277/235 B |
| 181756 | 11/1987 | Japan | 277/235 B |
| 293363 | 11/1988 | Japan | |
| 73157 | 3/1989 | Japan | 277/235 B |
| 6465367 | 3/1989 | Japan | |
| 15372 | 1/1992 | Japan | 277/235 B |

Primary Examiner—William A. Cuchlinski, Jr.
Assistant Examiner—Scott W. Cummings
Attorney, Agent, or Firm—Browdy and Neimark

[57] ABSTRACT

This metal gasket interposes a regulation plate having compression stop portions and beads between first and second elastic metal plates the convexities of beads of which face one another. The compression stop portions prevent complete compression of each bead and absorbs any irregularity between opposed fitting surfaces around holes for a combustion chamber. An intermediate plate having an offset portion is sandwiched between the regulation plate and the second elastic metal plate. The offset portion is shaped to a height smaller than the thickness of the compression stop portions and regulates the degree of compression of each bead.

9 Claims, 3 Drawing Sheets

METAL GASKET

BACKGROUND OF THE INVENTION

1. Field of the Invention

This invention relates to a metal gasket used for sealing fitting surfaces between a cylinder head and a cylinder block in a multiple-cylinder engine.

2. Description of the Prior Art

A metal gasket made from a metal material has been used conventionally for sealing a cylinder head and a cylinder block in an engine. The metal gasket has beads near through-holes correspondings to cylinder bores, water passages and oil passages, and when the cylinder head and the cylinder block are fastened and fixed by bolts, beads form elastic annular contact portions to the opposed fitting surfaces and seal them.

In engines of the recent types, however, a higher output and a smaller weight have been required, and an aluminum material having a smaller specific gravity tends to be employed in place of conventional materials having a great specific gravity such as steel and castings so as to produce the cylinder head, the cylinder block, and so forth. The aluminum material has a small weight but has low rigidity. Therefore, relative displacement of the cylinder head to the cylinder block tends to become great during the operation of the engine. When the opposed fitting surfaces of these structural materials are fastened by bolts through the single plate metal gasket, the opposed fitting surfaces are likely to be non-uniform because the bolt positions are dispersed relatively to the outer peripheral portions of the metal gasket and because they are not always distributed uniformly to the periphery of cylinder bores, that is, holes for combustion chambers. As a result, a combustion gas having a high temperature and a high pressure enters the gap between the opposed fitting surfaces at positions having a large distortion, such as in the regions between the holes for combustion chambers, and corrodes and contaminates the beads of the metal gasket, lowering thereby the seal effect.

In the case of the metal gasket, the gap between the cylinder head and the cylinder block repeatedly increases or decreases during the combustion cycles of the engine, and stresses or in other words, mechanical stress and thermal stress, repeatedly act on the metal gasket. This load change stress occurs as a great value at the portions having the lowest rigidity of the cylinder block and the cylinder head, so that the beads undergo buckling, cracks occur, and seal performance is deteriorated.

A metal gasket disclosed in Japanese Patent Laid-Open No. 293363/1988 is shown in FIG. 11. As shown in the drawing, two intermediate plates 65, 66 are laminated between elastic metal plates 61, 62 having beads 63, 64 so formed as to extend along the periphery of each hole 71, and spacer members 67, 68 are clamped between the two intermediate plates 65, 66 at portions closer to the hole 71 than the contact portion of the beads 63, 64. Compensation portions 69, 70 are disposed so as to compensate for any non-uniformity between the deck surfaces. In the metal gasket, the spacer members 67, 68 are clamped between the two intermediate plates 65, 66 at the portions closer to the hole 71 than the contact portion of the beads 63, 64. Therefore, one additional contact surface is provided to bear the seal force. The spacer members 67, 68 must be fixed to the intermediate plates 65, 66 by means such as welding, bonding, and so forth.

The metal gasket disclosed in Japanese Patent laid-Open No. 65367/1989 laminates two intermediate plates between two elastic metal plates forming beads along the periphery of holes. The edge of one of the intermediate plates is held in a grommet form by the edge of the other intermediate plate, and compensation bent portions are disposed on both surfaces so as to form substantially the same offset portions on both surfaces. In this metal gasket, the edge of one of the intermediate plates is held in the grommet form by the edge of the other, substantially the same offset portions are formed on both surfaces, and the bent portions for compensation are disposed. When they are clamped by bead substrates on both sides and are compressed under the buckled state between the cylinder head and the cylinder block, the turnup offset portions held in the grommet form function as the seam of the beads. As a result, the stress amplitude of the elastic metal plate drops, but the bending stress and the stress amplitude occur at the compression stop portions of the intermediate plates due to the difference of the operations of the upper and lower elastic metal plates.

SUMMARY OF THE INVENTION

It is therefore an object of the present invention to provide a metal gasket which interposes an intermediate elastic metal plate between a pair of elastic metal plates having beads, forms compression stop portions each formed by turning the end of the regulation plate back under itself to form a doubled over region having a large thickness at the edges portion of holes for combustion chamber of the intermediate elastic metal plate, prevents full compression of each bead of a pair of elastic metal plates by the compression stop portions to prevent buckling of each bead, forms compensation portions in the periphery of each hole, sets the thickness of the compensation portions to an arbitrary thickness to keep good balance of a seal face-to-face pressure, prevents breakage of the beads and the compensation portions and the drop of the seal effect, or interposes the intermediate plate between one of the elastic metal plates and the intermediate elastic metal plate so as to provide a stable seal effect without causing damages such as cracks even when a stress fluctuation is applied to the intermediate plate.

This metal gasket includes a pair of elastic metal plates having beads constituted by mutually opposing convexities along the outside of the holes for combustion chamber that are aligned with one another, and the intermediate elastic metal plates laminated on one of the elastic metal plates between the pair of elastic metal plates and having compression stop portions formed by turning up outward the peripheral portion of the holes matching with the holes described above in a radial direction of the hole and then heat-treating the same.

Accordingly, when this metal gasket is clamped and brought into the pressed state between the opposed fitting surfaces of the cylinder head and the cylinder block, each elastic metal plate undergoes deformation, and each bead of each elastic metal plate is strongly pushed to the opposed fitting surfaces at the annular portion where the bead starts and ends as viewed in the radial direction of the hole, and provides a strong double seal portion. At the same time, the thickness of the compression stop portion of the intermediate elastic metal portion is about twice the thickness of the portion consisting of the plate alone. Therefore, it strongly pushes each elastic metal plate to the opposed fitting surfaces around the hole, and another seal portion is formed at this portion. Since the thickness of the compression stop portion of the intermediate elastic metal plate is great as described above, it functions as a stopper for the bead deformation of each elastic metal plate, prevents full compression of the beads of each elastic metal plate, keeps its spring function as the elastic metal plate for a long time and prevents buckling of each elastic metal plate. Furthermore, even when any irregularity occurs in the opposed fitting surfaces between the cylinder head and the cylinder block at the time of fastening of the metal gasket, not only the bead portions but also the compression stop portions of the intermediate elastic metal plate undergo deformation in response to the distortion. Accordingly, the compression stop portions function as the compensation portions for compensating for the irregular gap between the opposed fitting surfaces around the holes for combustion chamber where seal performance is required most severely. Accordingly, sufficient seal functions can be obtained.

This metal gasket interposes the intermediate plate between the intermediate elastic metal plate and the elastic metal plate and forms the offset portion having a height smaller than the thickness of the compression stop portion around the periphery of the hole of the intermediate plate opposing the compression stop portion in such a manner as to extend in a departing direction from the turnup portion. When this metal gasket is fastened between the opposed fitting surfaces, and when the intermediate elastic metal plate and the elastic metal plate come close to the intermediate plate due to the deformation of the beads, the compression stop portion and the offset portion of the intermediate portion come into mutual contact before the beads undergo full deformation, because the height of the offset portion of the intermediate plate is smaller than the thickness of the compression stop portion. Accordingly, the offset portion of the intermediate plate functions as the stopper for the deformation of the beads on the side of the intermediate elastic metal plate. The offset portion functions also as the stopper for limiting the deformation of the beads of the elastic metal plate and the intermediate elastic metal plate by the height thereof for the other elastic metal plate, too. Accordingly, since the intermediate plate is disposed, excessive deformation stops before each bead undergoes complete compression for each elastic metal plate, and in this way, full compression of each bead of each of the upper and lower elastic metal plates can be prevented reliably. Since the intermediate plate is not at all provided with the compression stop portion, it has no portion of breakage even when the stress fluctuation acts on it. When the height of the offset portion of the intermediate plate is the half the thickness of the intermediate elastic metal plate, the stress load to each elastic metal plate is uniform and equal but when the offset portion of the intermediate plate is changed, the stress load distributed to each elastic metal plate can be increased or decreased. For example, the offset portion of the intermediate plate can be designed in consideration of rigidity of the cylinder head.

Furthermore, in this metal gasket, the compensation portion provided by the compression stop portion of the intermediate elastic metal plate is made of a material such as SUS 631, which is soft before machining but becomes hardened and highly tough after heat-treatment. Therefore, it can be machined in a desired way and can withstand stress fluctuation and repeated stress for a long time. As an example of machining, the compression stop portion of the intermediate elastic portion can be formed thickly in the regions between the holes and thinly in other regions, and a seal portion which is highly resistant to the leak of a combustion gas in the regions between the holes where the high temperature corrosive combustion gas is likely to leak.

In the metal gasket, the turnup distance of the compression stop portion can be changed. In other words, the compression stop portion of the intermediate elastic metal plate is shaped to a large width in the regions between the holes and to a small width in other regions. This metal gasket can provide a wide seal portion capable of blocking the leak of the combustion gas in the regions between the holes where the combustion gas is likely to leak, and the seal face-to-face pressure can be set with good balance in conformity with the rigidity of the cylinder head. Accordingly, the metal gasket having a small stress amplitude but having high durability can be obtained.

In this metal gasket, the strong wide seal portion withstanding the leak of the combustion gas is formed in the regions between the holes for combustion chamber where the high temperature and corrosive combustion gas is likely to occur, and stable seal can be secured around these hole. Furthermore, since the thickness of the compression stop portion can be adjusted before heat-treatment, an irregular value can be compensated for in conformity with the rigidity of the cylinder head.

If a soft member is interposed in the compression stop portion of the intermediate elastic metal plate in this metal gasket, the soft member compensates for an excessive height of the offset portion of the intermediate plate or an excessive height of the beads, facilitates thickness adjustment which will otherwise be very troublesome, and can improve deformability of the compression stop portion itself. Therefore, when the metal gasket is fastened on the opposed fitting surfaces, it can cope with the deformation of each elastic metal plate and can skillfully offset the irregularity of the opposed fitting surfaces. This metal gasket can absorb the vibration occurring between the cylinder head and the cylinder block during the engine operation.

DETAILED DESCRIPTION OF THE EMBODIMENTS

Hereinafter, a metal gasket according to an embodiment of the present invention will be explained with reference to the drawings.

Figure 1:
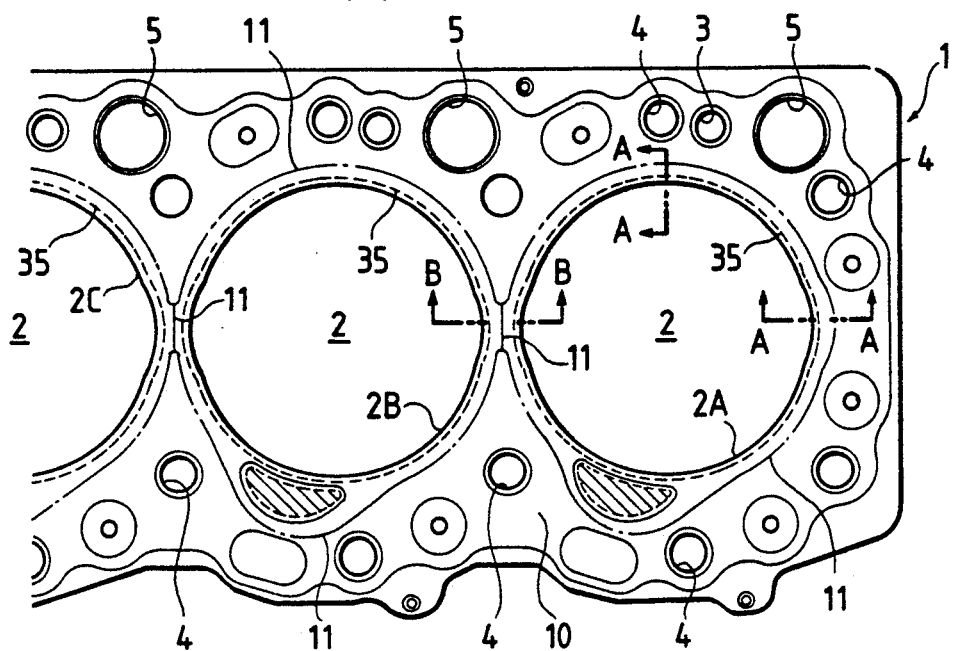
FIG. 1 is a partial plan view showing an embodiment of a metal gasket according to the present invention.

A metal gasket 1 shown in FIG. 1 is used for sealing opposed fitting surfaces between a cylinder head and a cylinder block in a multiple-cylinder Diesel engine such as a 4-cylinder or 6-cylinder Diesel engine. This metal gasket 1 has holes for a combustion chamber 2A, 2B, 2C (which will be hereinafter referred to generically as the "holes" and will be represented by reference numeral 2) corresponding in number to the cylinders of the engine, that is, cylinder bores.

In this embodiment, one of a pair of elastic metal plates positioned on a cylinder head side is used as an upper bead plate 10, and a regulation plate 30 as an intermediate elastic metal plate is superposed on this upper bead plate 10 so as to constitute a double elastic metal plate. The other of the elastic metal plates is used as a lower bead plate 20 positioned on the cylinder block side. A stress amplitude occurring in the elastic metal plate on the cylinder head side during the engine operation is greater than that of the elastic metal plate on the cylinder block side. Therefore, in this metal gasket 1, the double elastic metal plate is preferably disposed on the cylinder head side so as to reduce the stress. In other words, the regulation plate (intermediate elastic metal plate) 30 reduces the load stress to the bead plates 10, 20, and three elastic metal plates bear the load stress in the present invention whereas two elastic metal plates bear it in the prior art.

Generally, a hard material having a hardness Hv of 350 to 500 is used for the upper and lower bead plates 10, 20 as the elastic metal plates when cold rolling is employed. When the material has a hardness of Hv 350 or below, it is used by carrying out heat-treatment and when the material has a hardness of Hv 350 or above, it is used in some cases without heat-treatment. The regulation plate 30 is produced, for example, by turn-up machining and bead machining a material having a hardness Hv of 200 or below, and then heat-treating it to a hardness Hv of at least 350. When heat-treatment is carried out, it is possible to use SUS 630 or SUS 631 for precipitation hardening, SUS 304 or SUS 301 or SK materials (SK1 to SK7) for nitriding, SUS 420J$_2$ or SUS 440A for hardening and tempering treatment, and metal materials such as a titanium alloy or aluminum alloy for a solid solution heat-treatment. The hardness of the blank before bead machining is Hv 200 or below, for example.

A definite example of the hardness of the metal material of the bead plates 10, 20 after each heat-treatment is as follows. When SUS 304 and SUS 301 are subjected to nitriding treatment, the hardness is Hv 200 or below (only the surface) before the heat-treatment, and is Hv 350 to 400 for SUS 304 and Hv 350 to 500 for SUS 301 after the heat-treatment. When SUS 631 is heat-treated or in other words, is subjected to precipitation hardening treatment, after bead machining, the hardness is Hv 200 or below before the heat-treatment and is Hv 350 to 500 after the heat-treatment. Besides the above, heat-treatment of SK materials (SK1 to SK7), hardening-/tempering treatment of SUS 420J$_2$, and solid solution heat-treatment of a titanium alloy and an aluminum alloy (6Al1 - 2Sn - 4Zr - 6Mo) can be carried out.

Water holes 3 for passing cooling water, fastening bolt holes 4, oil holes 5 for passing oil, oil return holes, knock holes, rivet holes, and so forth, are bored at the same position and in the same size in the upper bead plate 10, the lower bead plate 20, the regulation plate 30 and a later-appearing intermediate plate 40.

A non-metallic materials having heat resistance and oil resistance such as a fluoro rubber, resin, etc, is applied to both surfaces of the metal gasket 1, that is, the portions which might be exposed to a combustion gas and the portions which come into mutual metallic contact, to a thickness of about 10 to 50 $\mu$m (preferably, 25 $\mu$m). Such a coating can prevent metal-to-metal contact between the cylinder head and the cylinder block and can secure corrosion resistance, durability and strength as the metal gasket. Even when any concavo-convexities exist on the machined surface of the metal gasket, the nonmetallic material described above can cover these concavo-convexities and can exhibit a sufficient seal function.

Figure 3:
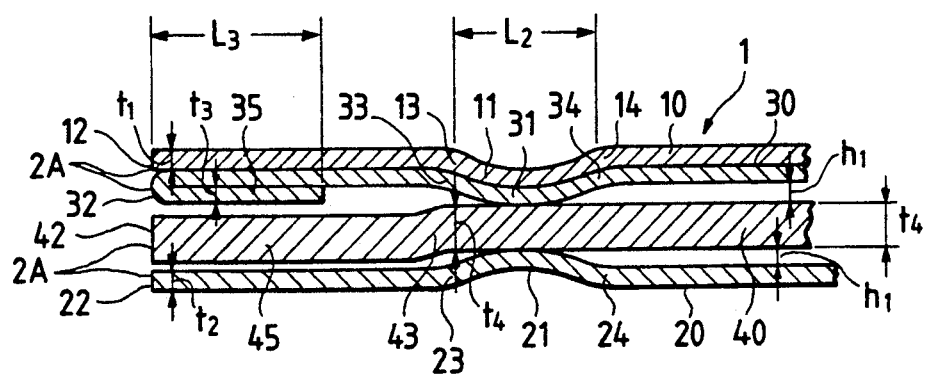
FIG. 3 is an enlarged sectional view taken along a line A—A in FIG. 1.
Figure 4:
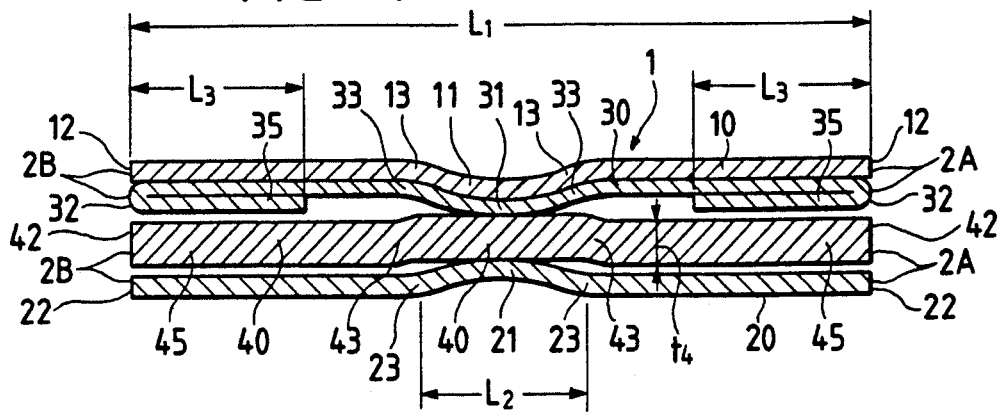
FIG. 4 is an enlarged sectional view showing portions between holes for a combustion chamber and taken along a line B—B in FIG. 1.

This metal gasket 1 can be constituted as shown in FIGS. 3 and 4 by way of example. FIG. 3 shows the section of the metal gasket 1 along a line A—A connecting the hole 2A to the edge portion, and regions other than portions between the holes 2 (e.g. the region between the hole 2A and the hole 2B where the holes are adjacent to each other) have the same sectional structure. FIG. 4 shows the section between the holes 2 of the metal gasket 1 cut along a line B—B connecting the centers of the holes 2A and 2B in the boundary region of the holes 2A and 2B adjacent to each other, and this sectional structure is the same for the boundary regions for other adjacent holes 2.

In this metal gasket 1, the diameter of the hole 2 is 92 mm, for example, and the minimum distance $L_1$ between the holes 2 is about 10 mm. The metal gasket 1 is produced by laminating the upper plate 10, the regulation plate 30 laminated on the upper bead plate 10 with its bead shape being matched with that of the upper bead plate 10, the intermediate plate 40 and the lower bead plate 20 from the cylinder head side to the cylinder block side in order named. The upper and lower bead plates 10, 20 are produced from the SUS 301 or SUS 304 material, and their thickness $t_1$, $t_2$ is 0.25 mm with the hardness of at least Hv 350. The regulation plate 30 is produced from the SUS 304 material, its thickness $t_3$ is 0.20 mm and its hardness is at least Hv 350. The intermediate plate 40 is made from a material selected from SA1C, SUS 301, SUS 304, an Al steel sheet or a Zn steel sheet, and its thickness $t_4$ is 0.5 mm.

The proximity peripheral portions of the upper bead plate 10, lower bead plate 20 and regulation plate 30 of the metal gasket 1, which are spaced apart outward from the inner peripheral end surfaces 12, 22, 32 defining the holes 2 for a combustion chamber in the radial direction of the hole 2, respectively, are shaped into beads 11, 21, 31 equipped with protuberances having a mountain-like section surrounding concentrically and annularly the hole 2. One of the surfaces of each of these beads 11, 21, 31 formed along each hole 2, is shaped into a convexity while the other surface is shaped into a concavity, in such a manner as to constitute a seal portion, and on the side extending towards the intermediate plate 40 in the regions from the starting edges 13, 23, 33 to the trailing edges 14, 24, 34 as viewed from the inside of each hole 2 in the radial direction. The bead 31 of the regulation plate 30 has the same shape as that of the bead 11 of the upper bead plate 10, and under the laminated state, the upper bead plate 10 and the regulation plate 30 overlap with each other at the portions of the beads 11 and 31.

Figure 2:
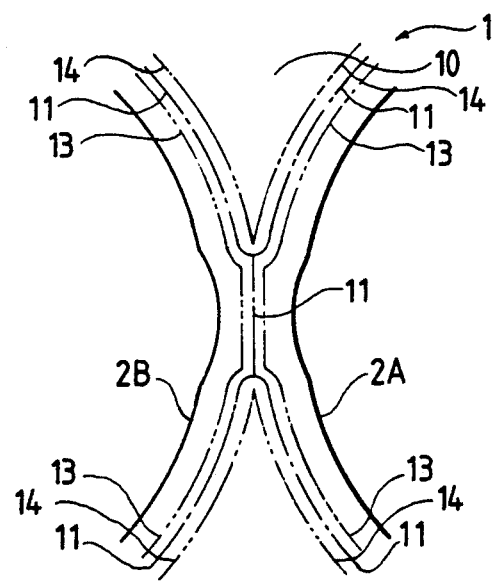
FIG. 2 is an enlarged plan view showing portions between adjacent holes for a combustion chamber in FIG. 1.

As shown in FIG. 2, the beads 11, 21, 31 around the hole 2A of the upper and lower bead plates 10, 20 and the regulation plate 30 overlap with the beads 11, 21, 31 around the adjacent hole 2B in the proximity regions of these holes 2A and 2B. In other words, the beads 11, 21, 31 merge in the region between the holes 2 and turn into one bead 11, 21, 31. However, the adjacent beads may be disposed with a slight gap between them without being put one upon another. The top surface of the convexity of the center region of the bead may be shaped substantially into a flat surface so as to stabilize the contact between the convexity of the bead and the intermediate plate 40. For example, a width $L_2$ as viewed in the radial direction of the bead is about 3 mm, and the height of the bead is about 0.25 mm.

A compression stop portion 35 is defined around the inner edge 32 defining the hole 2 of the regulation plate 30 on the convexity side of the bead 31 and within the range in which it does not overlap with the bead 31 on the inner side in the radial direction of the bead 31. The width $L_3$ of this compression stop portion 35 is, for example, about 2.5 mm. Furthermore, as to the sectional structure in the holes such as the water holes 3, etc, between the regulation plate 30 and the intermediate plate 40, both of them are laminated in a flat shape, though the sectional structure is not shown in the drawing, and the peripheral portions of the hole 3 of the upper and lower bead plates 10, 20 are deformed in such a manner as to describe a slight recess (or a mountain) from the other flat portions concentrically with the hole 3, and to provide excellent sealability around the hole 3 at the time of fastening.

The embodiment shown in FIGS. 3 and 4 represents an embodiment wherein the intermediate plate 40 is sandwiched between the regulation plate 30 and the lower bead plate 20. The intermediate plate 40 has a uniform thickness $t_4$ and is generally shaped in a flat shape. However, its peripheral region 45 of the hole for the combustion chamber opposing the compression stop portion 35 is shaped into an offset portion bent towards the lower bead plate 20 with respect to other regions. In the example shown in the drawing, the offset portion 43 is formed in the bent form at a position slightly inside the positions where the beads 11, 21, 31 of each elastic metal plate are formed, in the radial direction of the hole 2, and the hole peripheral edge region 45 extending inward from the position of this offset portion 43 in the radial direction is deviated from the main body portion of the intermediate plate 40 towards the lower bead plate 20 by the offset portion 43. Accordingly, the offset portions 43 are positioned on both sides of the bead in the region between the holes 2. The height of this offset portion 43 is set to be lower than the thickness of the regulation plate 30 itself.

Figure 5:
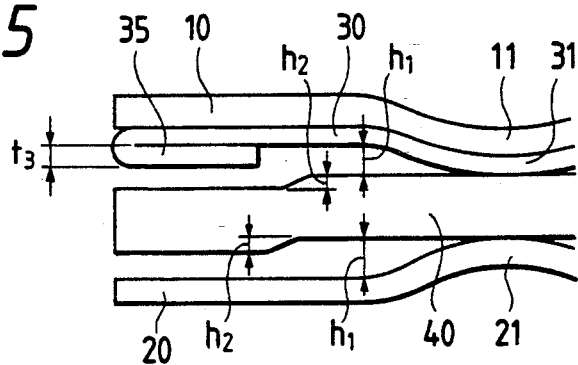
FIG. 5 is an enlarged explanatory view showing a dimensional relation around a hole periphery.

The dimensional relation of the height of the beads 11, 21 of the upper and lower bead plates 10, 20, the height of the offset portion 43 and the thickness of the regulation plate 30 is shown in FIG. 5. The bead height of the bead 11 of the upper bead plate 10, the bead height of the bead 21 of the lower bead plate 20 and the bead height of the bead 31 of the regulation plate 30 are the same, and are expressed by $h_1$. The height of the offset portion 43 of the intermediate plate 40 is expressed by $h_2$. The thickness of the compression stop portion 35 of the regulation plate 30 is expressed by $t_3$. The gap $\delta_u$ till the compression stop portion 35 of the regulation plate 30 comes into contact with the peripheral edge region 45 of the hole 2 equipped with the offset portion of the intermediate plate 40 is $\delta_u = h_1 + h_2 - t_3$, and the gap $\delta_L$ till the lower bead plate 20 comes into contact with the peripheral edge region 45 of the hole 2 of the intermediate plate 40 is $\delta_L = h_1 - h_2$. When the gap $\delta_U$ is preferably equal to the gap $\delta_L$, $h_2 = t_3/2$ because $\delta U = \delta_L$. In other words, the height of the offset portion 43 is the half of the thickness of the compression stop portion 35 of the regulation plate 30. If the height $h_2$ of the offset portion 43 is greater than the thickness $t_3$ of the compression stop portion 35, it is not possible to prevent complete compression of each bead 11, 21 of the upper bead plate 10 and the regulation plate 30. Accordingly, the height $h_2$ of the offset portion 43 must be smaller than the thickness $t_3$ of the compression stop portion 35. With the exception of this last limitation, the dimensional relation is not limited to the one described above but can be modified to some extents.

The operation of the embodiment shown in FIGS. 3 and 4 will be explained. When the metal gasket 1 is disposed between the opposed fitting surfaces of the engine and is fastened, the beads 11, 21 of the upper and lower bead plates 10, 20 start deformation, are strongly pressed at the end portions 13, 14 and 23, 24 of the bead start and end of the beads 11, 21 to the opposed fitting surfaces, and form the double seal portion around the hole 2. The seal portions are formed similarly around the water hole 3, the bolt hole 4 and the oil hole 5, and well seal the peripheries of these holes. Around the hole 2, the compression stop portion 35 of the regulation plate 30 and the peripheral portion of the lower bead plate 20 around the hole 2 come into contact with the surfaces of the hole peripheral region 45 of the intermediate plate 40. Since the compression stop portion 35 does not completely fill the height of the offset portion 43, it forms the seal portion in the region of the compression stop portion 35, while the bead 11 of the upper bead plate 10 is not compressed completely. Accordingly, each bead does not undergo buckling. As to the lower bead plate 20, too, the bead 21 is not completely compressed due to the offset portion 43 of the intermediate plate 40, and buckling of the beads 11, 21 is prevented. The compression stop portion 35 has a function as a compensation portion. Particularly when non-uniformity of the opposed fitting surfaces occurs during fitting of the upper bead plate 10, the compensation portion absorbs distortion and deformation resulting from the load change after fastening. The intermediate plate 40 forms the offset by bend shaping but does not involve any machining involving turnup. In other words, there is no portion which causes breakage such as cracks by the repeated load and the change of load acting on the intermediate plate 40. Therefore, the trouble of the metal gasket 1 owing to the intermediate plate 40 does not occur.

Machining of the regulation plate 30 inclusive of the compression stop portion 35 can be changed arbitrarily. For example, when the bead plate 10 and the regulation plate 30 are laminated while the shape of their beads 11, 31 are matched, the regulation plate 30 is heat-treated after machining of the compression stop portion 35 of the regulation plate 30. Therefore, the regulation plate 30 is heated and hardened, and acquires high toughness. Therefore, the regulation plate 30 itself has high toughness and its resistance to the load change and the repeated stress is improved. Furthermore, the reinforcing function is provided to the upper bead plate 10 laminated on the regulation plate 30. The compression stop thickness of the turnup portion 35 may be uniform at the time of turnup machining of the regulation plate 30, but machining can be made in such a manner that the compression stop portion 35 is thick in the regions between the holes 2 but is thin in the regions other than the regions between the holes 2. Since the strong seal portions are formed in the regions between the holes 2 where a high temperature and corrosive combustion gas is likely to leak, the metal gasket 1 strongly seals the leak of this combustion gas. The compression stop distance of the turnup portion 35 can be changed. In other words, the compression stop portion 35 of the regulation plate 30 is machined so that its width is great in the regions between the holes 2 and is small in the other regions. In this case, the stable and wide seal regions to withstand the leak of the combustion gas can be obtained in the regions between the holes 2 at which the combustion gas is likely to leak.

Figure 6:
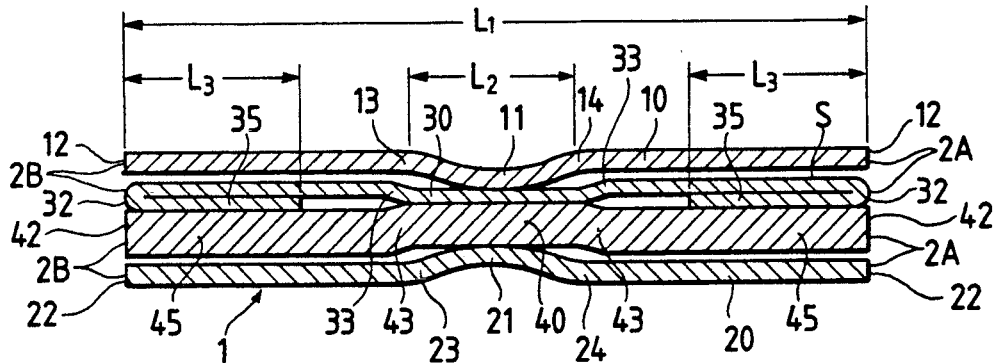
FIG. 6 is an enlarged sectional view showing portions between adjacent holes for a combustion chamber of a metal gasket according to another embodiment of the present invention.
Figure 7:
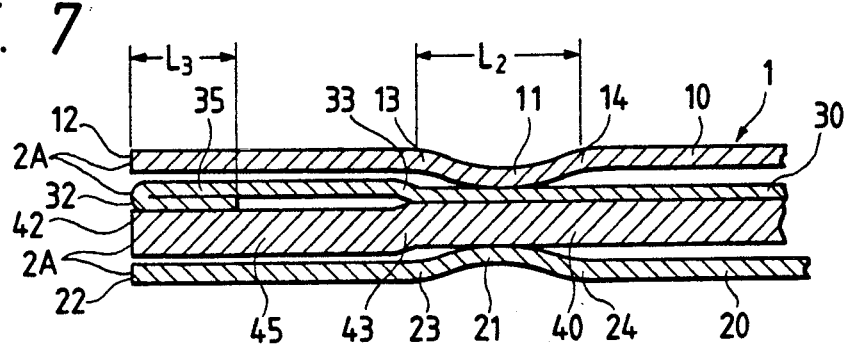
FIG. 7 is an enlarged sectional view showing portions around the holes for a combustion chamber and corresponding to the embodiment shown in FIG. 6.

The embodiment shown in FIGS. 6 and 7 is basically the same as the embodiment shown in FIGS. 3 and 4. Therefore, like reference numerals will be used to identify like constituents and the repetition of the explanation will be omitted. In the metal gasket 1 shown in FIGS. 6 and 7, the regulation plate 30 is not equipped with the bead portion. Therefore, the compression stop portion 35 is laminated on the intermediate plate 40 without a gap. Accordingly, a space S is, formed between the upper bead plate 10 and the compression stop portion 35 of the regulation plate 30. The regulation plate 30 is heat-treated after turnup machining. Prevention of complete compression of the bead portions 11, 21 of the upper and lower bead plates 10, 20 and the compensation function of the compression stop portion 35 are the same as in the embodiment described above.

Figure 8:
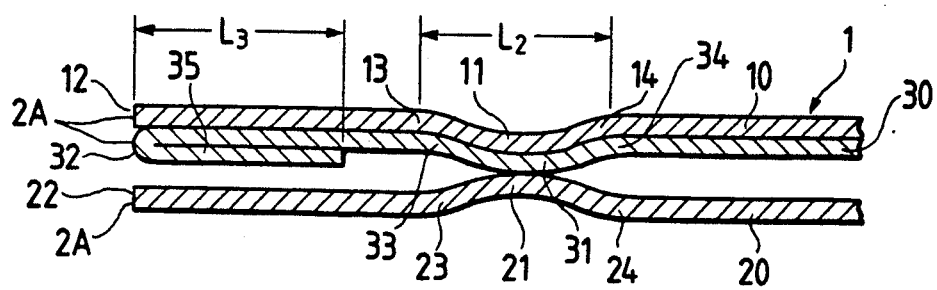
FIG. 8 is an enlarged sectional view showing portions between adjacent holes for a combustion chamber of a metal gasket according to still another embodiment of the present invention.
Figure 9:
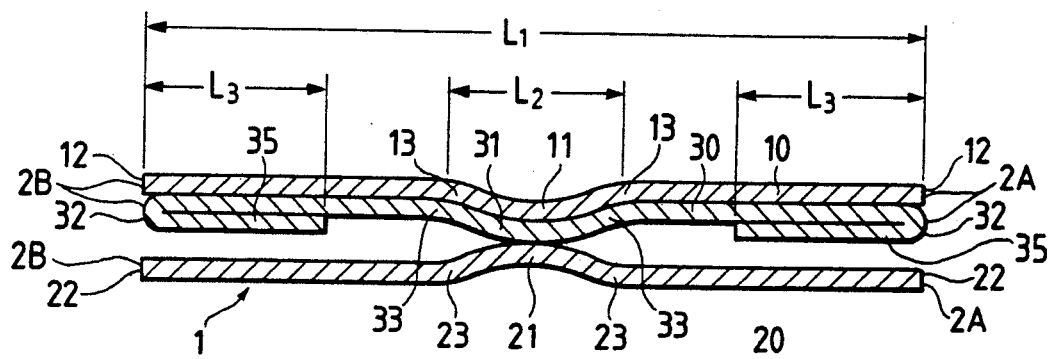
FIG. 9 is an enlarged sectional view showing portions between the holes for a combustion chamber and corresponding to the embodiment shown in FIG. 8.

Next, the embodiment shown in FIGS. 8 and 9 will be explained. This embodiment represents an embodiment wherein the intermediate plate is omitted and the regulation plate 30 and the lower bead plate 20 are in direct touch with each other. In this embodiment, too, like reference numerals are used to identify like constituents and the repetition of the explanation is omitted. The regulation plate 30 includes the bead plate 31 having the bead shape matching the upper bead plate 10 and is laminated without a space. The convexity of the bead 31 of the regulation plate 30 is in contact with the convexity of the bead 21 of the lower bead plate 20. The compression stop portion 35 of the regulation plate 30 can exhibit the reinforcing function to the upper bead plate 10. As to the prevention of complete compression of the bead of the bead plate by the compression stop portion 35 and the offsetting function for irregularities of the opposed fitting surfaces at the time of fastening, the similar effects can be obtained in the same way as in the foregoing embodiments.

Figure 10:
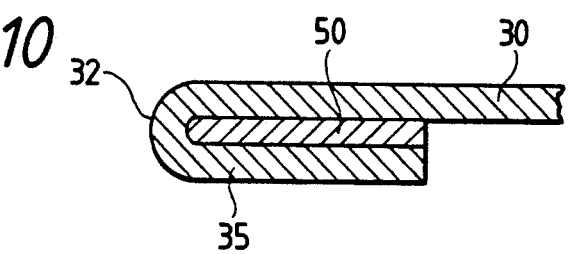
FIG. 10 is an enlarged sectional view showing a metal gasket according to till another embodiment of the present invention and showing a compression stop portion interposing a soft member.
Figure 11:
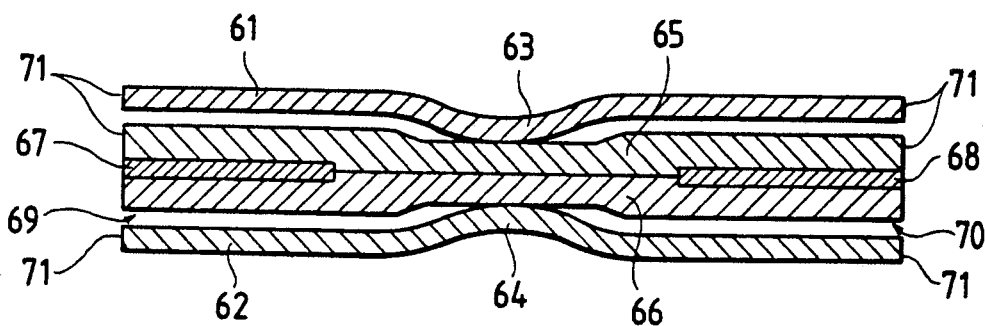
FIG. 11 is a sectional view showing an example of portions between holes for a combustion chamber of a conventional metal gasket.

The embodiment shown in FIG. 10 represents an embodiment wherein the compression stop portion 35 of the regulation plate 30 interposes a soft member 50 and is then turned up. This embodiment can be applied to the embodiment having the intermediate plate and to the embodiment not having the same. The soft member 50 may be a soft metal sheet, a heat-insulating graphite sheet, an aramide type heater sheet, a resin or a rubber. When the intermediate sheet is provided, the soft member 50 compenstates for the thickness when the offset of the intermediate plate is great, and for the height of the beads 11, 21 when their thickness is too great, irrespective of the existence of the intermediate plate. Since the soft member 50 improves deformability of the compression stop portion 35 itself, it can cope with the deformation of the upper and lower bead plates 10, 20 at the time of fastening of the metal gasket 1 on the opposed fitting surfaces, and well absorbs any irregularity of the opposed fitting surfaces. The soft member 50 can absorb the vibration occurring between the cylinder head and the cylinder block during the operation of the engine.

What is claimed is:

1. In a metal gasket including elastic metal plates disposed between a cylinder block and a cylinder head fixed to said cylinder block, the elastic metal plates being made of a metal material having elasticity and having holes for combustion chamber and beads as seal portions having convexities on one surface thereof and concavities on another surface thereof formed along said holes, said metal gasket comprising:

said elastic metal plates consisting of a first elastic metal plate, a second elastic metal plate, and a regulation plate and an intermediate plate both disposed between said first elastic metal plate and said second elastic metal plate;

said first elastic metal plate having first holes and first beads formed along said first holes and having convexities on one surface thereof and concavities on another surface thereof;

said regulation plate having third holes matching with said first holes, third beads formed along said third holes and having convexities on one surface thereof and concavities on another surface thereof, compression stop portions each formed by turning an end of said regulation plate back under itself to form a doubled over region, said convexities of said first beads being laminated on said concavities of said third beads, and said compression stop portions being shaped to a thickness smaller than the height of said third beads, so as to prevent full compression of said third beads;

said second elastic plate being disposed to oppose said regulation plate, and having second beads facing said third beads, and said convexities of said third beads and said convexities of said second beads oppose one another;

said intermediate plate being disposed between said regulation plate and said second elastic plate, and having fourth holes corresponding to said second holes and an offset portion extending in a direction spaced apart from said compression stop portions and having a thickness below that of said compression stop portions.

2. A metal gasket according to claim 1, wherein a height of said offset portion is smaller than a thickness of said regulation plate.

3. A metal gasket according to claim 1, wherein said first elastic plate is disposed on a side of said cylinder head and said second elastic metal plate is disposed on a side of said cylinder block.

4. In a metal gasket including elastic metal plates disposed between a cylinder block and a cylinder head fixed to said cylinder block, the elastic metal plates being made of a metal material having elasticity and having holes for combustion chamber and beads as seal portions having convexities on one surface thereof and concavities on another surface thereof formed along said holes, said metal gasket comprising:

said elastic metal plates consisting of a first elastic metal plate, a second elastic metal plate, and a regulation plate disposed between said first elastic metal plate and said second elastic metal plate;

said first elastic metal plate having first holes and first beads formed along said first holes and having convexities on one surface thereof and concavities on another surface thereof;

said regulation plate having third holes corresponding to said first holes, third beads formed along said third holes and having convexities on one surface thereof and concavities on another surface thereof, and compression stop portions each formed by turning an end of regulation plate back under itself to form a doubled over region, said convexities of said first beads being laminated on said concavities of said third beads, said compression stop portions being shaped to have a thickness smaller that a height of said third beads, so as to prevent full compression of said third beads;

said second elastic plate being disposed to oppose said regulation plate, and having second beads facing said third beads, and said convexities of said third beads and said convexities of said second beads oppose one another and come into mutual contact.

5. A metal gasket according to claim 4, wherein said regulation plate is heat-treated after said compression stop portions are formed.

6. A metal gasket according to claim 4, wherein said compression stop portions contain a soft member.

7. A metal gasket according to claim 4, wherein said convexities of said regulation plates are tightly fitted into said concavities of said first beads of said first elastic plate.

8. A metal gasket according to claim 4 wherein said compression stop portions are each formed to a large thickness at a region where said third beads of adjacent said third holes are merged with each other, and formed to a small thickness at a region other than said region of said large thickness.

9. A metal gasket according to claim 4, wherein said compression stop portions are each formed to a large width at a region where said third beads of the adjacent third holes are merged with each other, and formed to a small width at a region other than said region of said large width.

* * * * *